(12) United States Patent
Chen (10) Patent No.: US 7,430,808 B2
(45) Date of Patent: Oct. 7, 2008

(54) LASER ALIGNMENT DEVICE FOR DRILLING MACHINE

(75) Inventor: Jung-Huo Chen, Taichung Hsien (TW)

(73) Assignee: Rexon Industrial Corporation Ltd., Taichung (TW)

( * ) Notice: Subject to any disclaimer, the term of this patent is extended or adjusted under 35 U.S.C. 154(b) by 0 days.

(21) Appl. No.: 11/984,128

(22) Filed: Nov. 14, 2007

(65) Prior Publication Data

US 2008/0110036 A1  May 15, 2008

(30) Foreign Application Priority Data

Nov. 14, 2006  (CN) .................. 2006 1 0138162

(51) Int. Cl.
*G01B 11/27* (2006.01)
(52) U.S. Cl. .................. 33/286; 33/263; 33/638; 33/DIG. 21
(58) Field of Classification Search .................. 33/286, 33/263, 280, 638, 626, 833, 613, 645, 632, 33/640, 642, DIG. 21, 520, 534
See application file for complete search history.

(56) References Cited

U.S. PATENT DOCUMENTS

| | | | | |
|---|---|---|---|---|
| 6,665,948 | B1 * | 12/2003 | Kozin et al. | .................. 33/833 |
| 6,813,843 | B1 * | 11/2004 | Faubion | .................. 33/638 |
| 6,832,440 | B2 * | 12/2004 | Navarro et al. | .................. 33/638 |
| 6,921,235 | B2 | 7/2005 | Chen | |
| 6,937,336 | B2 | 8/2005 | Garcia et al. | |
| 6,945,741 | B2 * | 9/2005 | Wang et al. | .................. 408/16 |
| 7,146,739 | B2 * | 12/2006 | Ku et al. | .................. 33/286 |
| 7,243,440 | B2 * | 7/2007 | DeKeyser | .................. 33/626 |
| 2004/0128849 | A1 * | 7/2004 | Navarro et al. | .................. 33/638 |
| 2004/0136795 | A1 | 7/2004 | Chen | |
| 2005/0152755 | A1 | 7/2005 | Chen et al. | |
| 2006/0104731 | A1 | 5/2006 | Etter et al. | |
| 2006/0112581 | A1 * | 6/2006 | Nortmann et al. | .................. 33/638 |

FOREIGN PATENT DOCUMENTS

TW  M264026  5/2005
TW  M280877  11/2005

* cited by examiner

*Primary Examiner*—Yaritza Guadalupe-McCall
(74) *Attorney, Agent, or Firm*—Bacon & Thomas, PLLC (57) ABSTRACT

A laser alignment device includes a base adapted to be installed in a drilling machine above the worktable of the drilling machine. The base has two through holes, a first laser module mounted in one through hole and operable to emit a first laser beam, a second laser module, which has a laser emitter mounted in the other through hole and operable to emit a second laser beam from its bottom side. The second laser module has a protruding portion extending around the periphery of the laser emitter and engaging the inside wall of the associated through hole to maintain the laser emitter away from the inside wall of the associated through hole Setting devices are mounted in the base and are inserted into one through hole to engage the periphery of the laser emitter of the second laser module.

16 Claims, 7 Drawing Sheets

LASER ALIGNMENT DEVICE FOR DRILLING MACHINE

BACKGROUND

1. Field of the Invention

The present invention relates to a laser alignment device and more particularly, to a laser alignment device for use in a drilling machine to facilitate quick positioning of a workpiece on a worktable of a drilling machine.

2. Description of the Related Art

During a drilling operation of a conventional drilling machine, the operator must draw lines on the workpiece in order to mark the location of the hole to be drilled, and then operate a probe bit of the drilling machine to drill a notch on the workpiece so as to check whether the notch is at the marked location or not. When the notch and the marked location are matched, the selected drilling bit is installed in the chuck of the drilling machine and aimed at the notch on the workpiece, and then the drilling machine is operated to drill the desired hole on the workpiece.

According to the aforesaid operation procedure, several trials may be necessary to set the hole site. This operation procedure is complicated and time-consuming. Further, the hole site as finally set does not have a high precision.

U.S. Pat. No. 7,146,739 discloses a laser-guiding coordination device for a drilling machine. The laser-guiding coordination device comprises a C-base, two adjusters provided at two sides of the C-base, two laser-line projectors oppositely embedded inside the adjusters, and a switch attached to the C-base to electrically connect with the two laser-line projectors. By means of adjusting the adjusters, the position of the intersection point of the two lines of laser light produced by the two laser beams from the two laser projectors on the worktable of the drilling machine is adjusted. This design of a laser-guiding coordination device is functional, however it has a complicated structure. Further, the assembly of the laser-guiding coordination device is also complicated. The laser-line projectors are installed in the adjusters, and then the adjusters are installed in the C-base. Therefore, an improved design that has a less complex structure is desired.

SUMMARY

The present embodiments have been accomplished in view of the circumstances described above. Accordingly, the present embodiments provide a laser alignment device for a drilling machine, which have a simple structure and are easy to assemble, and can quickly and accurately set the processing position of the workpiece.

In view of the above discussion, an embodiment of the laser alignment device is comprised of a base, two laser modules, and at least one setting device. The base is adapted to be installed in a drilling machine above a worktable. The base includes two through holes. The laser modules are respectively mounted in the through holes of the base and are operable to emit a respective laser beam. One laser module comprises a laser emitter mounted in the associated through hole of the base, and is operable to emit a laser beam through its bottom side. The laser module also includes a protruding portion extending around the periphery of the laser emitter. The protruding portion is arranged to contact the periphery of the associated through hole of the base in order to maintain the laser emitter spaced from the periphery of the associated through hole. The at least one setting device is mounted in the base and inserted into one through hole of the base and engaging the laser emitter.

In one embodiment, the two laser modules are identical, and the at least one setting device includes multiple setting devices respectively inserted into the through holes of the base and respectively engaging the laser emitters of the laser modules.

DETAILED DESCRIPTION OF VARIOUS EMBODIMENTS

Figure 1:
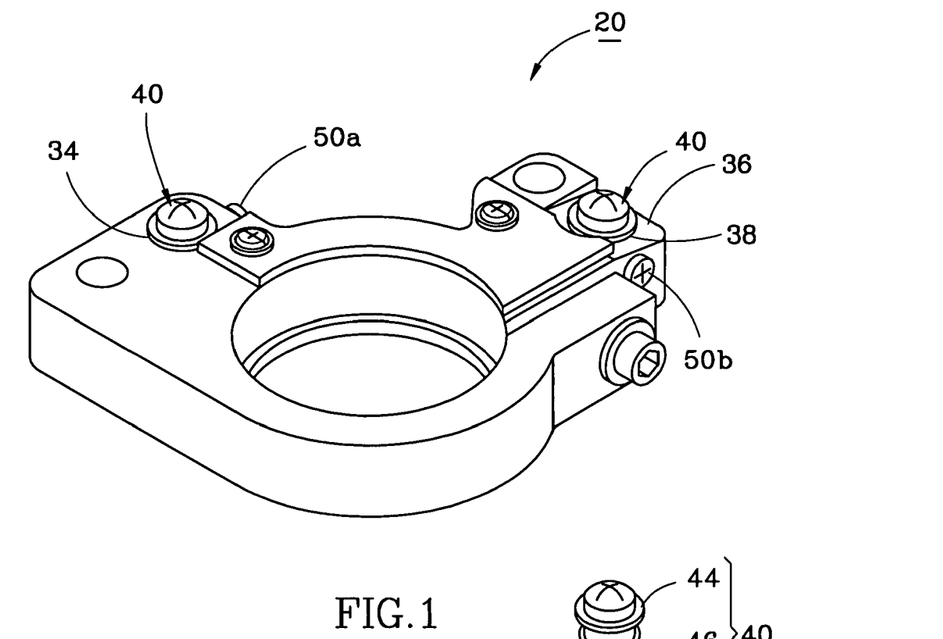
FIG. 1 is an elevational view of a laser alignment device in accordance with a first embodiment of the present disclosure.
Figure 2:
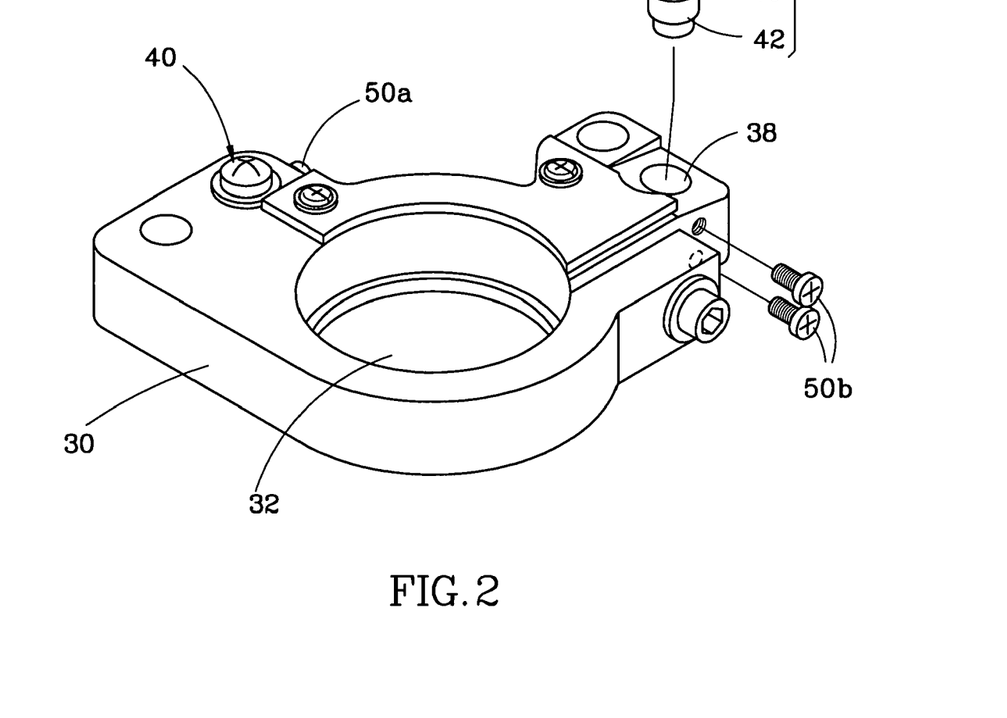
FIG. 2 is an exploded view of the laser alignment device in accordance with a first embodiment of the present disclosure.
Figure 3:
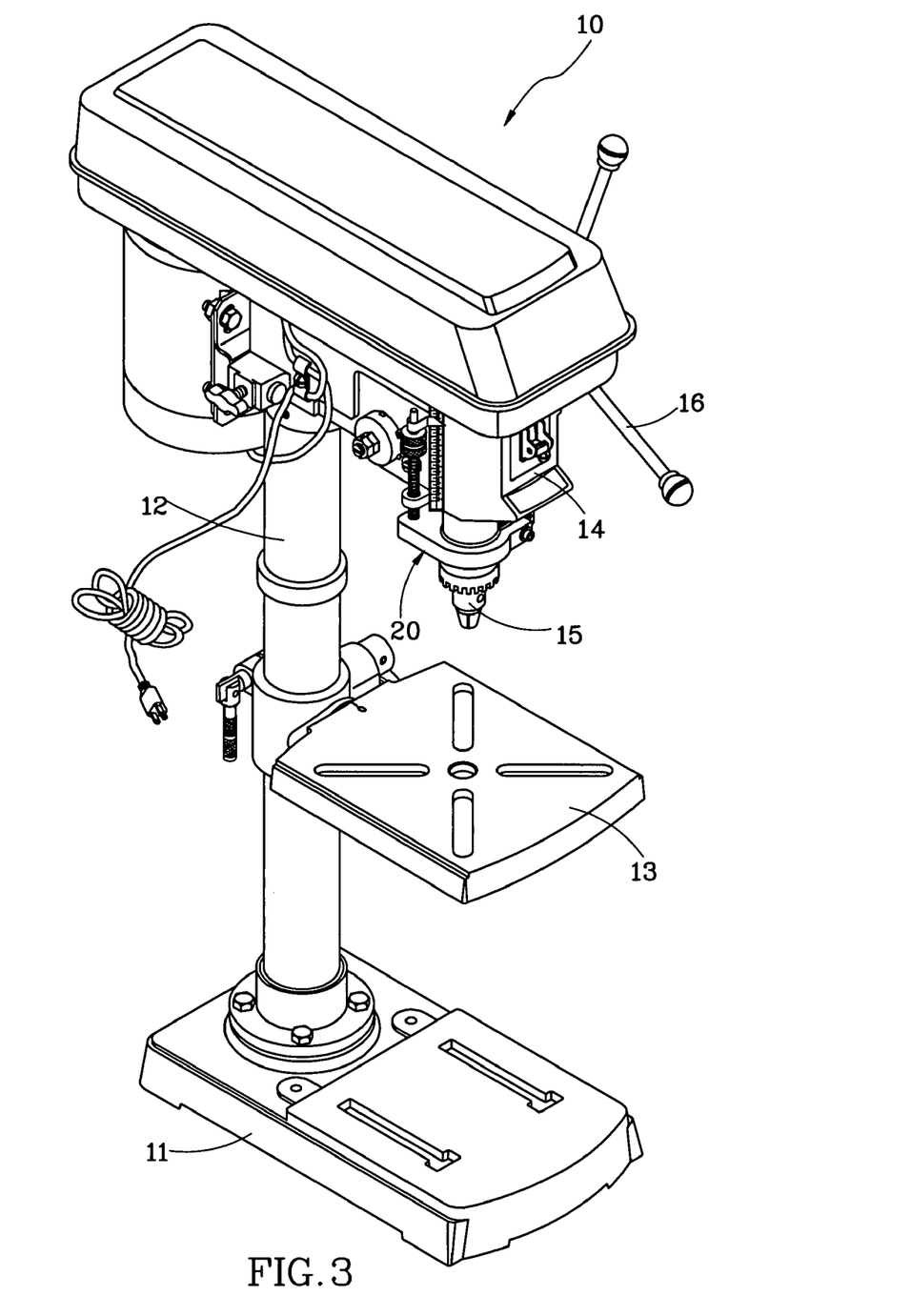
FIG. 3 is an oblique elevational view of a drilling machine carrying a laser alignment device in accordance with the first embodiment of the present disclosure.

Referring to FIGS. 1-3, a laser alignment device 20 in accordance with a first embodiment of the present disclosure is shown installed on a drilling machine 10. The drilling machine 10 comprises a base 11, a support 12 provided at the top side of the base 11, a worktable 13 adjustably mounted on the support 12, a main shaft box 14 provided at the top side of the support 12, and a chuck 15 installed in the main shaft box 14 above the worktable 13 for securing a drill bit. The laser alignment device 20 comprises a base member 30, two laser modules 40, and four setting devices 50a and 50b. According to this embodiment, the setting devices 50a and 50b are threaded screws.

The base member 30 comprises a mounting hole 32 defined through its top and bottom walls at a central portion thereof. By means of the mounting hole 32, the base member 30 is fastened to the chuck 15 above the worktable 13. The base member 30 further comprises a first through hole 34 defined through its top and bottom walls in a perpendicular manner relative to its top wall and in a parallel manner relative to the longitudinal axis of the chuck 15. A sloping platform 36 is disposed at one lateral side and slopes obliquely outwards at a predetermined angle, and a second through hole 38 is defined through the top and bottom walls of the sloping platform 36 in a perpendicular manner relative to the sloping top wall of the sloping platform 36. Therefore, the axis of the second through hole 38 defines, along with the top wall of the base member 30 and the longitudinal axis of the chuck 15, a respective contained angle.

Figure 4:
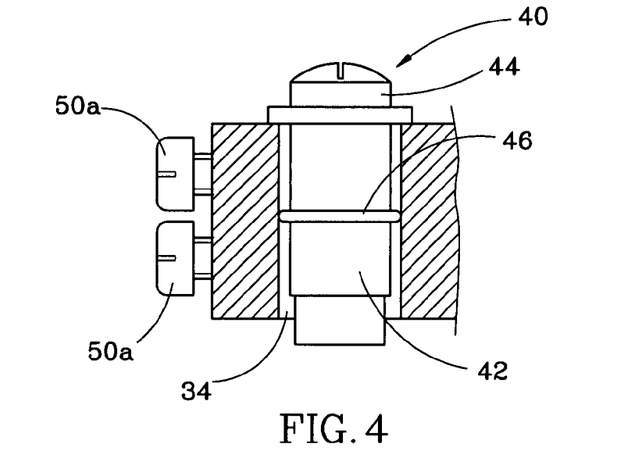
FIG. 4 is a sectional view of a part of the laser alignment device in accordance with the first embodiment of the present disclosure, showing the positioning of the laser module in the first through hole.
Figure 5:
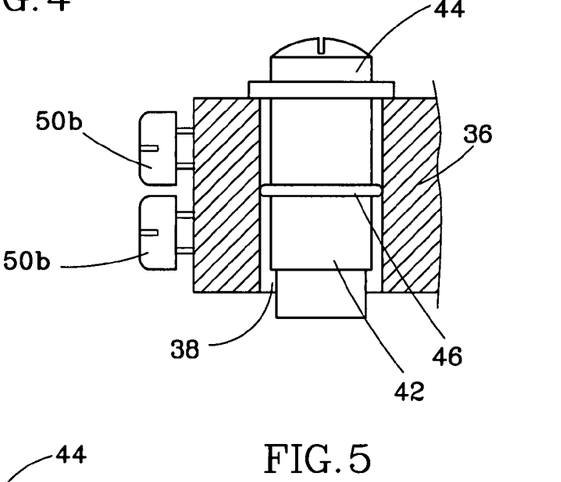
FIG. 5 is a sectional view of a part of the laser alignment device in accordance with the first embodiment of the present disclosure, showing the positioning of the laser module in the second through hole.
Figure 6:
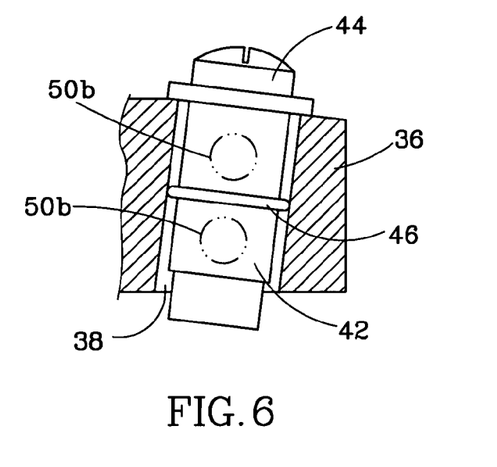
FIG. 6 corresponds to FIG. 5 as viewed from another side.

Referring to FIGS. 4-6, the laser modules 40 each comprise a laser emitter 42, a head 44 connected to the top end of the laser emitter 42, and a protruding portion 46 protruding from the periphery of the laser emitter 42. According to this embodiment, the protruding portion 46 is a ring fastened to the periphery of the laser emitter 42. The laser emitter 42 of each laser module 40 is operable to emit a laser beam from its bottom side, thus producing a line of laser light on the worksurface of the worktable 13. The two laser modules 40 are respectively mounted in the first through hole 34 and the second through hole 38. When the two laser modules 40 are respectively inserted into the first through hole 34 and the second through hole 38, the heads 44 of the laser modules 40 respectively rest upon the top wall of the base member 20 and the top wall of the sloping platform 36, and the rings 46 respectively engage the peripheral wall of the first through hole 34 and the peripheral wall of the second through hole 38 to maintain the respective laser emitters 42 spaced from the respective peripheral walls of the through holes 34, 38 at a predetermined distance. By means of manipulating the respective heads 44, the laser emitters 42 can be rotated and/or tilted in the respective through holes 34 and 38 to adjust the intersection angle between the lines of laser light formed by the two laser beams on the worktable 13. The ring 46 works to support rotation and/or tilting of the respective laser emitter 42 in the respective through hole 34 or 38, and to prevent bias of the respective laser emitter 42 in the respective through hole 34 or 38 during rotation and/or tilting of the respective laser emitter 42. Further, the ring 46 divides the respective laser emitter 42 into an upper portion and a lower portion.

The two setting devices 50*a* are transversely mounted through one side of the base member 30 at different elevations and respectively engage the upper portion and lower portion of the laser emitter 42 of the laser module 40 in the first through hole 34 to set the laser module 40 in position. The other two setting devices 50*b* are transversely mounted through one side of the base member 30 adjacent to the sloping platform 36 at different elevations and respectively engage the upper portion and lower portion of the laser emitter 42 of the laser module 40 in the second through hole 38 to set the laser module 40 in position.

Figure 7:
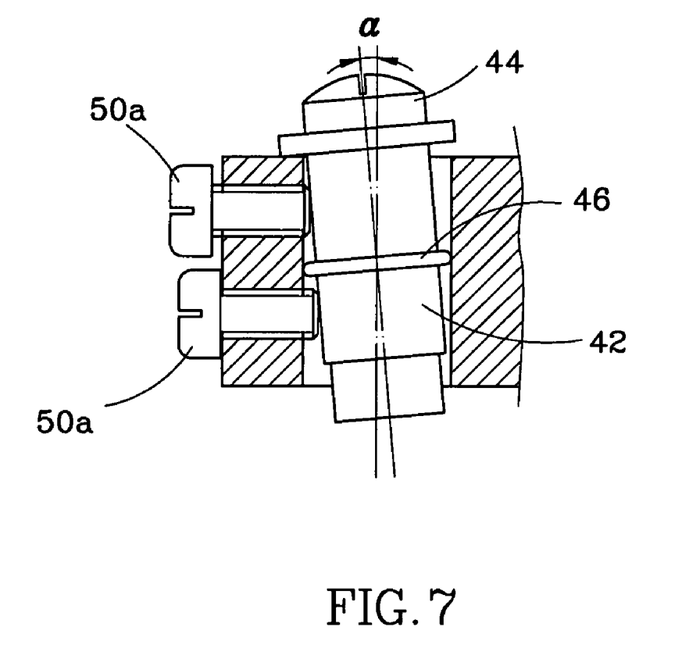
FIG. 7 is a sectional view of a part of the laser alignment device in accordance with the first embodiment of the present disclosure, showing the adjustment of the tilting angle of the laser module in the first through hole.
Figure 8:
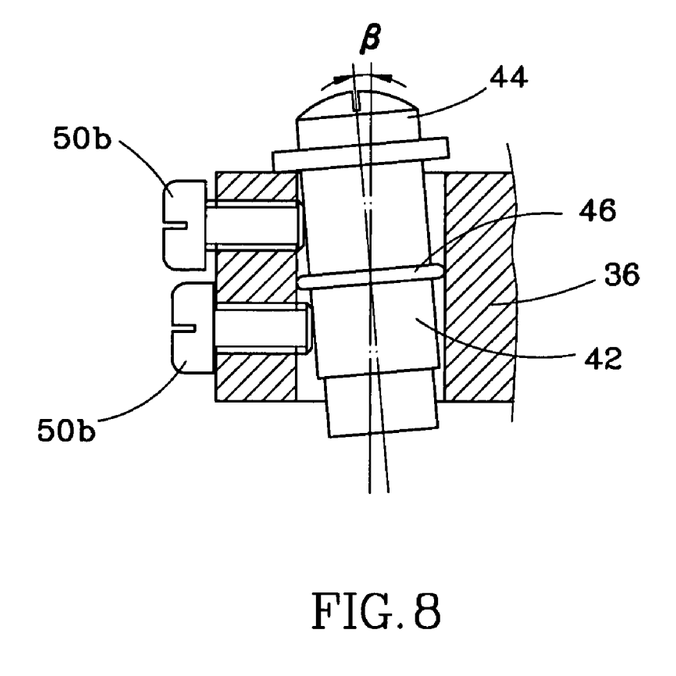
FIG. 8 is a sectional view of a part of the laser alignment device in accordance with the first embodiment of the present disclosure, showing the adjustment of the tilting angle of the laser module in the second through hole.
Figure 9:
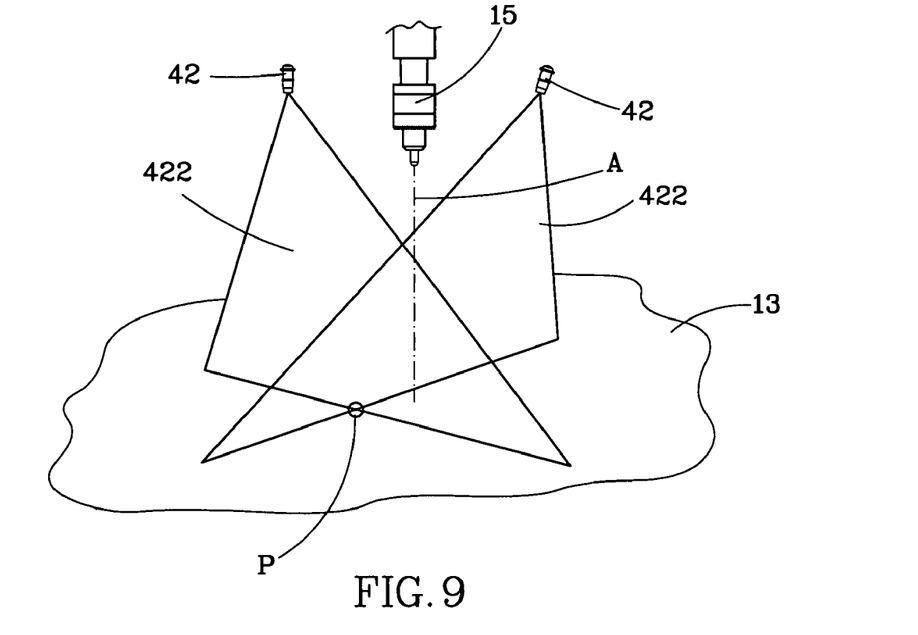
FIG. 9 is a schematic drawing of the present disclosure, showing the intersection point of the two lines of laser light deviated from the imaginary extension line of the longitudinal central axis of the chuck.
Figure 10:
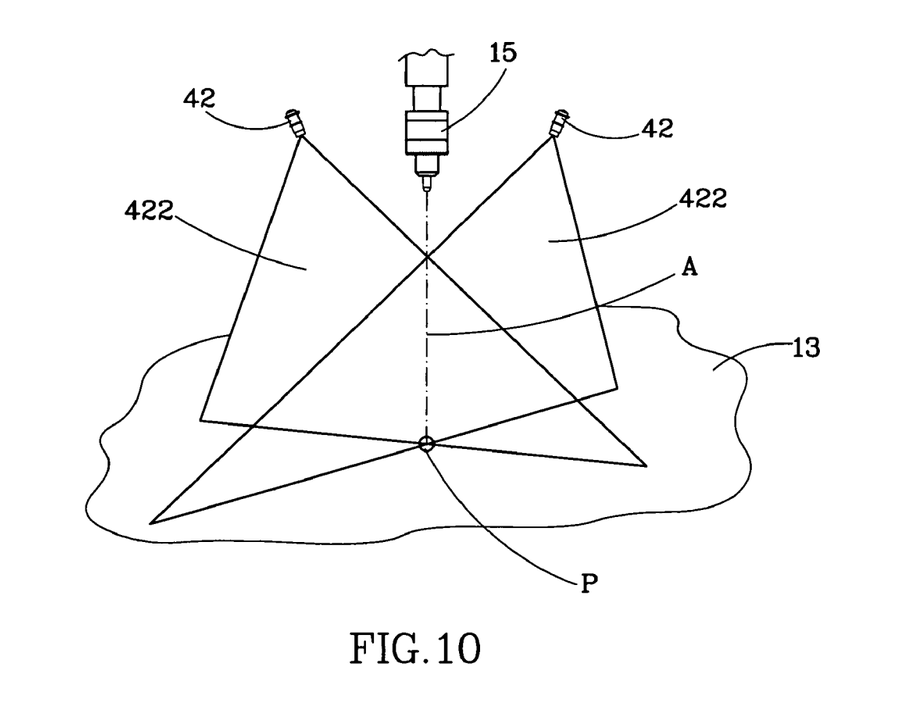
FIG. 10 is a schematic drawing of the present disclosure, showing the intersection point of the two lines of laser light disposed in coincidence with the imaginary extension line of the longitudinal central axis of the chuck.

Before operating the drilling machine 10, it is necessary to mark the location of the hole to be drilled on the workpiece. At this time, the laser modules 40 are activated to cause the respective laser emitters 42 to emit a respective laser beam 422. Thereafter, the head 44 of each laser module 40 is rotated and/or tilted in order to adjust the extending direction of the respective line of laser light on the worksurface of the worktable 13. If the intersection point P of the two lines of laser light produced on the workpiece on the worktable 13 by the two laser beams 422 from the two laser modules 40 is not in coincidence with the imaginary extension line A of the longitudinal central axis of the chuck 15, as shown in FIG. 9, the setting devices 50*a* or 50*b* are tightened or loosened in order to adjust the tilting angle α or β of the laser emitter 42 of each laser module 40 in the through hole 34 or 38, as shown in FIGS. 7 and 8. In this manner, one or both of the projected lines of laser light is incrementally moved in a substantially parallel stepwise manner until the intersection point P of the two lines of laser light produced on the workpiece on the worktable 13 by the two laser beams 422 from the two laser modules 40 is in coincidence with the imaginary extension line A of the longitudinal central axis of the chuck 15, as shown in FIG. 10. At this time, the operator can operate the handle 16 of the drilling machine 10 to lower the chuck 15, thus starting the hole-drilling operation.

As stated above, the laser alignment device is a simple design that is easy to assemble. By means of aiming the intersection point of the two laser beams of the two laser modules at the workpiece, the hole-drilling operation can be performed rapidly and accurately without any trial drilling with a probe bit. Therefore, the use of the disclosed laser alignment device in a drilling machine greatly improves the working efficiency of the drilling machine.

Figure 11:
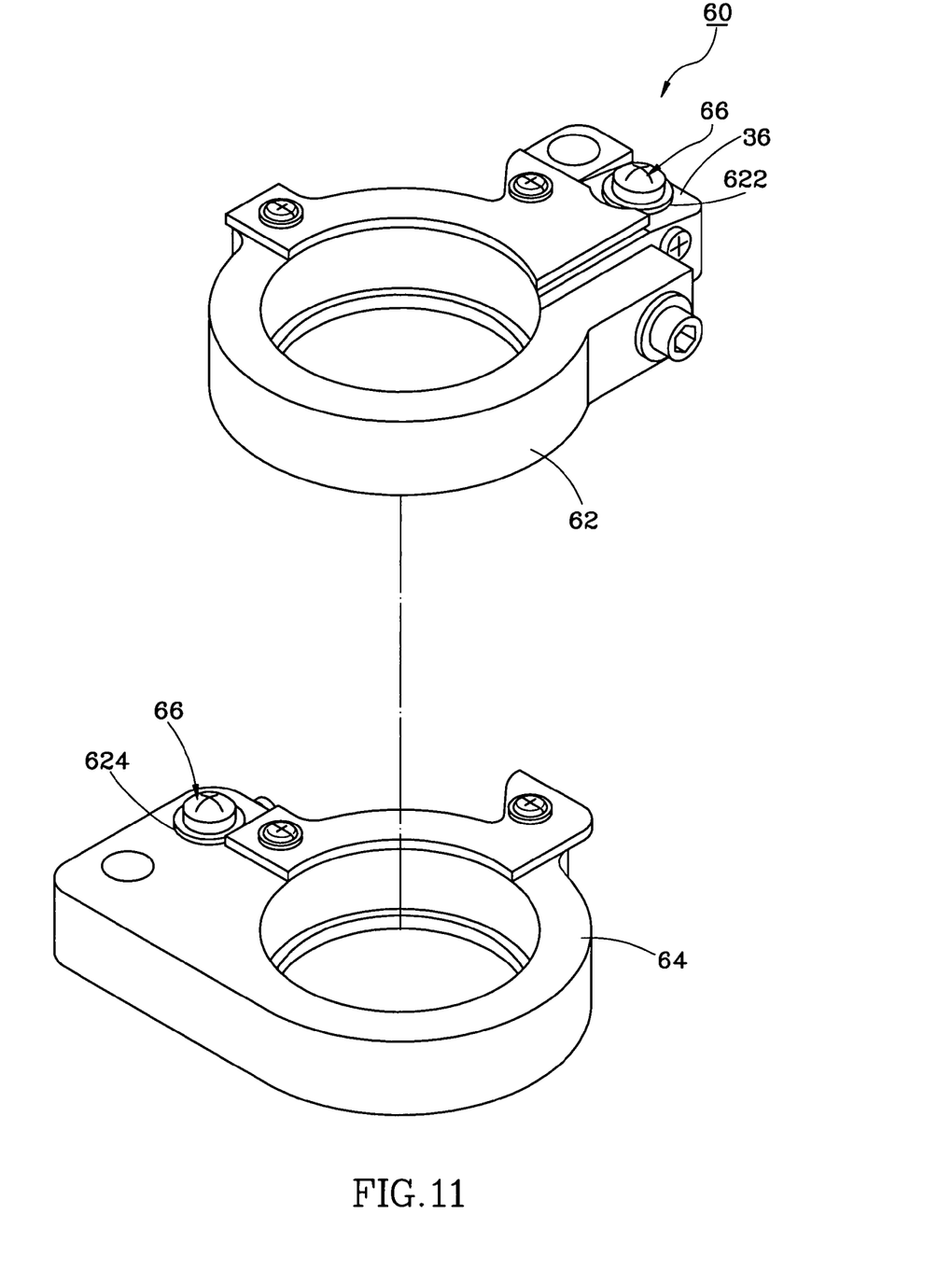
FIG. 11 is an exploded view of a laser alignment device in accordance with a second embodiment of the present disclosure.
Figure 12:
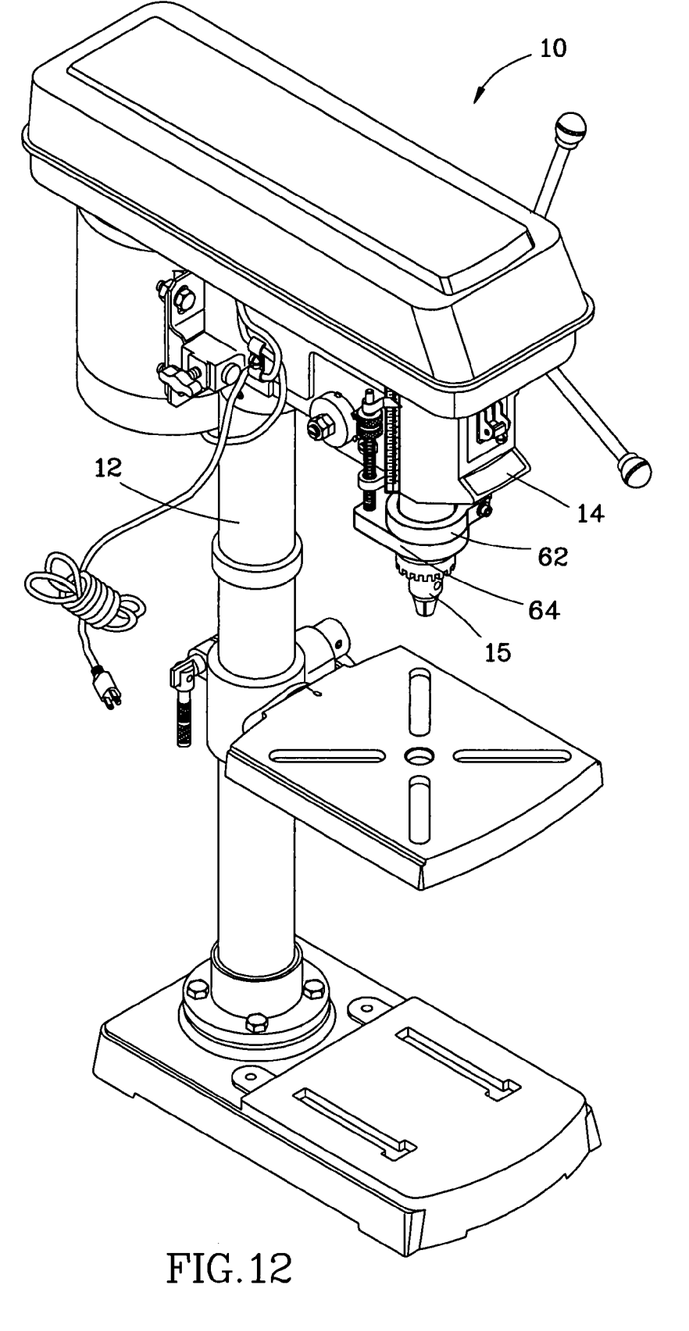
FIG. 12 is an oblique elevational view of a drilling machine carrying a laser alignment device in accordance with the second embodiment of the present disclosure.

FIG. 11 illustrates a laser alignment device 60 in accordance with a second embodiment of the present disclosure. This embodiment is substantially similar to the aforesaid first embodiment with the exception that two base members are used in this second embodiment. As illustrated, the laser alignment device 60 comprises a first base member 62, a second base member 64, a first through hole 622 formed in the first base member 62, a second through hole 624 formed in the second base member 64, and two laser modules 66 respectively mounted in the first through hole 622 and the second through hole 624. The first base member 62 and the second base member 64 are mounted on the chuck 15 of the drilling machine 10 and stacked together, as shown in FIG. 12.

As shown in FIG. 11, the sloping platform or surface 36 is positioned on the first base member 62. Of course, it will be recognized that the sloping platform or surface 36 can just as easily be positioned on second base member 64.

In the manner discussed above, by means of adjusting the tilting angle of each laser module 66, the intersection point of the two laser beams of the two laser modules 66 is aimed at the workpiece, facilitating the hole-drilling operation.

Although particular embodiments of the disclosure have been described in detail for purposes of illustration, various modifications and enhancements may be made without departing from the spirit and scope of the invention. Accordingly, the invention is not to be limited except as by the appended claims.

What is claimed is:

1. A laser alignment device for use in a drilling machine having a worktable for carrying a workpiece to be drilled, the laser alignment device comprising:

a base adapted for being mounted on a drilling machine above a worktable, said base defining a first through hole and a second through hole extending through top and bottom walls thereof;

a first laser module mounted in said first through hole and operable to emit a first laser beam;

a second laser module mounted in said second through hole and having a laser emitter positioned in said second through hole and operable to emit a second laser beam, and a protruding portion extending around a periphery of said laser emitter and contacting a periphery of said second through hole to maintain said laser emitter spaced from the periphery of said second through hole; and at least one setting device respectively inserted through said base into said second through hole and engaging the laser emitter.

2. The laser alignment device as claimed in claim 1, wherein said protruding portion of said second laser module divides said laser emitter into an upper portion and a lower portion; said at least one setting device includes a first setting device mounted in said base and engaging the upper portion of said laser emitter, and a second setting device mounted in said base and engaging the lower portion of said laser emitter.

3. The laser alignment device as claimed in claim 1, wherein said protruding portion is a ring fastened to the periphery of said laser emitter.

4. The laser alignment device as claimed in claim 3, wherein said laser emitter is rotatable and/or tiltable in said second through hole.

5. The laser alignment device as claimed in claim 1, wherein said first through hole extends vertically through the top and bottom walls of said base; and
    said second through hole extends through the top and bottom walls of said base at a non-parallel angle with respect to said first through hole.

6. The laser alignment device as claimed in claim 5, wherein said base further comprises a sloping wall; said second through hole being perpendicularly formed in said sloping wall.

7. The laser alignment device as claimed in claim 1, wherein said base is adapted to be fastened to a chuck of a drilling machine.

8. The laser alignment device as claimed in claim 1, wherein said second laser beam of said laser emitter is arranged to produce a line of laser light at a worktable; and
    said at least one setting device is operable to move said line of laser light in a substantially parallel stepwise manner across a worktable.

9. A laser alignment device for use in a drilling machine having a worktable for carrying a workpiece to be drilled, the laser alignment device comprising:
    a base adapted for being mounted in a drilling machine above a worktable, said base defining first and second through holes extending through top and bottom walls thereof;
    first and second laser modules respectively mounted in the first and second through holes and each having a laser emitter positioned in the respective through hole and operable to emit a respective laser beam, and a protruding portion extending around a periphery of the respective laser emitter and contacting a periphery of the associated through hole to maintain the respective laser emitter spaced from the periphery of the associated through hole;
    a plurality of setting devices respectively inserted through said base into each of the first and second through holes and engaging the respective laser emitters.

10. The laser alignment device as claimed in claim 9, wherein the protruding portion of each of said laser modules divides the associated laser emitter into an upper portion and a lower portion; and
    said setting devices include two first setting devices and two second setting devices respectively mounted in said base and respectively engaging the upper and lower portions of said laser emitters.

11. The laser alignment device as claimed in claim 9, wherein each said protruding portion is a ring fastened to the periphery of the associated laser emitter.

12. The laser alignment device as claimed in claim 11, wherein each said laser emitter is rotatable and/or tiltable in the associated through hole.

13. The laser alignment device as claimed in claim 9, wherein said first through hole extends vertically through the top and bottom walls of said base; and
    said second through hole extends through the top and bottom walls of said base at a non-parallel angle with respect to said first through hole.

14. The laser alignment device as claimed in claim 9, wherein said base further comprises a sloping wall; said second through hole being perpendicularly formed in said sloping wall.

15. The laser alignment device as claimed in claim 9, wherein said base is adapted to be fastened to a chuck of a drilling machine.

16. The laser alignment device as claimed in claim 9, wherein the laser beams produced by the first and second laser modules are arranged to produce first and second lines of laser light on a worktable; and
    said setting devices are operable to move said first and second lines of laser light in a substantially parallel stepwise manner across a worktable.

* * * * *